(12) United States Patent
Yang et al.

(10) Patent No.: US 8,547,648 B2
(45) Date of Patent: Oct. 1, 2013

(54) MICRO-LENS MODULE

(75) Inventors: Chuan-Hui Yang, Tainan County (TW); Nai-Yuan Tang, Tainan County (TW)

(73) Assignee: Himax Semiconductor, Inc., Tainan (TW)

( * ) Notice: Subject to any disclaimer, the term of this patent is extended or adjusted under 35 U.S.C. 154(b) by 192 days.

(21) Appl. No.: 12/890,115

(22) Filed: Sep. 24, 2010

(65) Prior Publication Data
US 2012/0075724 A1    Mar. 29, 2012

(51) Int. Cl.
*G02B 13/18*    (2006.01)
*G02B 9/06*    (2006.01)

(52) U.S. Cl.
USPC .......................................... 359/718; 359/794

(58) Field of Classification Search
USPC ................. 359/713–718, 794, 796, 797, 740
See application file for complete search history.

(56) References Cited

U.S. PATENT DOCUMENTS

| | | | | |
|---|---|---|---|---|
| 7,474,480 B2 * | 1/2009 | Oh et al. | | 359/794 |
| 7,841,785 B2 * | 11/2010 | Hirao et al. | | 396/439 |
| 8,068,291 B2 * | 11/2011 | Hirao et al. | | 359/793 |
| 8,111,471 B2 * | 2/2012 | Ozaki | | 359/754 |
| 2003/0002174 A1 | 1/2003 | Dou | | |
| 2009/0086339 A1 * | 4/2009 | Oh et al. | | 359/764 |
| 2010/0118416 A1 * | 5/2010 | Do | | 359/716 |
| 2010/0315724 A1 * | 12/2010 | Fukuta et al. | | 359/716 |
| 2010/0321795 A1 * | 12/2010 | Shyu et al. | | 359/716 |
| 2012/0075725 A1 * | 3/2012 | Huddleston et al. | | 359/718 |

FOREIGN PATENT DOCUMENTS

| | | | |
|---|---|---|---|
| CN | 1934422 | | 3/2007 |
| TW | 200909848 | | 3/2009 |
| TW | 200934649 | | 8/2009 |
| WO | WO 2008/102774 | * | 8/2008 |

OTHER PUBLICATIONS

"Office Action of Taiwan Counterpart Application", issued on Jun. 20, 2013, p1-p6.

* cited by examiner

*Primary Examiner* — Jordan Schwartz
(74) *Attorney, Agent, or Firm* — J.C. Patents

(57) ABSTRACT

A micro-lens module including a first lens, a second lens, and an aperture stop is provided. The first lens is disposed between an object side and an image side, wherein a first surface of the first lens facing the object side is an aspheric surface, and the curvature radius of the aspheric surface is R1. The second lens is disposed between the first lens and the image side, wherein a second surface of the second lens facing the image side is an aspheric surface, and the curvature radius of the aspheric surface is R2. The aperture stop is disposed between the first lens and the second lens, wherein the distance from the first surface to the aperture stop is d1, and the distance from the second surface to the aperture stop is d2. The micro-lens module satisfies 6>d2/d1>2.5 and −2.5<R1/R2<1.5.

4 Claims, 6 Drawing Sheets

MICRO-LENS MODULE

BACKGROUND OF THE INVENTION

1. Field of the Invention

The invention generally relates to a lens module, and more particularly, to a micro-lens module.

2. Description of Related Art

Along with the development of technologies, many portable electronic products, such as cell phones and personal digital assistants (PDAs), are disposed with micro camera lenses such that users can take snapshots of their daily lives by using these portable electronic products. Thereby, the picture taking function has become one of the most essential functions in portable electronic products along with the constant improvement in the performance and the constant decrease in the price of the portable electronic products.

In addition, along with the development of optical technology, the sizes of image sensing devices (for example, charge coupled devices (CCDs) or complementary metal-oxide-semiconductor (CMOS) image sensors) have become smaller and smaller. As a result, the sizes of lenses used in portable electronic products have to be reduced in order to meet the requirement of high portability.

Presently, the imaging lens composed of a group of lenses is a practical form to achieve an ideal image quality with minimized lens volume.

SUMMARY OF THE INVENTION

Accordingly, the invention is directed to a micro-lens module which offers high image quality, low fabricating cost, and small volume.

The invention provides a micro-lens module including a first lens, a second lens, and an aperture stop. The first lens is disposed between an object side and an image side, wherein a first surface of the first lens facing the object side is an aspheric surface, and the curvature radius of the aspheric surface is R1. The second lens is disposed between the first lens and the image side, wherein a second surface of the second lens facing the image side is an aspheric surface, and the curvature radius of the aspheric surface is R2. The aperture stop is disposed between the first lens and the second lens, wherein the distance from the first surface to the aperture stop is d1, and the distance from the second surface to the aperture stop is d2. The micro-lens module satisfies $6>d2/d1>2.5$ and $-2.5<R1/R2<1.5$.

According to an embodiment of the invention, the effective focal length (EFL) of the micro-lens module is f, and the micro-lens module satisfies $0.8<f<1.6$.

According to an embodiment of the invention, the first surface is a convex surface, and the first lens is a plano-convex lens having its convex surface facing the object side.

According to an embodiment of the invention, the second surface is a convex surface, and the second lens is a plano-convex lens having its convex surface facing the image side.

According to an embodiment of the invention, the material refractive index of the first lens and the second lens is $n_d$, wherein $1.62>n_d>1.48$.

According to an embodiment of the invention, the micro-lens module further includes an optical detector, and the micro-lens module is sequentially composed of the first lens, the aperture stop, the second lens, and the optical detector from the object side to the image side.

According to an embodiment of the invention, the micro-lens module further includes a light transmissive device, and the first lens and the second lens are respectively leaned against two opposite sides of the light transmissive device.

As described above, a micro-lens module provided by an exemplary embodiment of the invention with the structure described above offers high image quality, low fabricating cost, and small volume.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
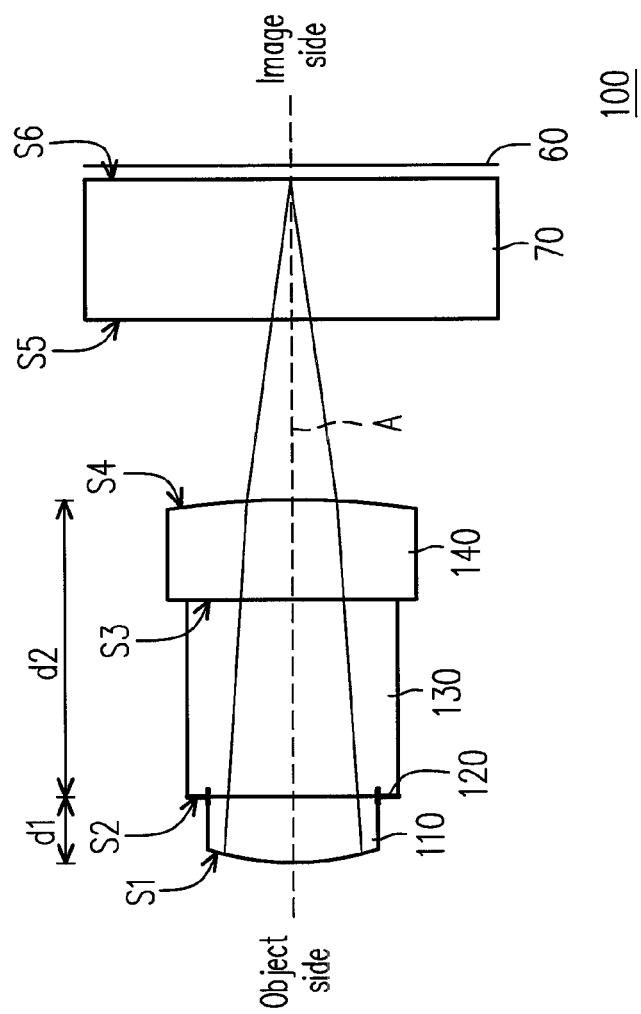
FIG. 1 is a structure diagram of a micro-lens module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a structure diagram of a micro-lens module according to an embodiment of the invention. Referring to FIG. 1, in the present embodiment, the micro-lens module 100 is disposed between an object side and an image side, and the micro-lens module 100 includes a first lens 110, an aperture stop 120, a light transmissive device 130, and a second lens 140 sequentially arranged from the object side to the image side. In the present embodiment, the diopters of the first lens 110 and the second lens 140 are both positive.

To be specific, the first lens 110 is disposed between the object side and the image side, and a surface 51 thereof that faces the object side is an aspheric surface, wherein the curvature radius of the surface 51 is R1. The second lens 140 is disposed between the first lens 110 and the image side, and a surface S4 thereof that faces the image side is an aspheric surface, wherein the curvature radius of the surface S4 is R2. The aperture stop 120 is disposed between the first lens 110 and the second lens 140. In the present embodiment, the distance from the surface 51 of the first lens 110 to the aperture stop 120 is defined as d1, and the distance from the surface S4 of the second lens 140 to the aperture stop is defined as d2. The first lens 110 and the second lens 140 are respectively leaned against two opposite sides of the light transmissive device 130 (for example, a piece of glass). To be specific, in the present embodiment, the first lens 110 is a plano-convex lens having its convex surface facing the object side, and the second lens 140 is a plano-convex lens having its convex surface facing the image side. Additionally, in the present embodiment, the material refractive index of the first lens 110 and the second lens 140 is $n_d$, wherein $1.62>n_d>1.48$.

An optical detector 60 is usually disposed at the image side. In the present embodiment, the optical detector 60 may be a charge coupled device (CCD) or a complementary metal-oxide-semiconductor (CMOS) sensor. The micro-lens module 100 can form an image on the optical detector 60 by using a light beam coming from the object side. In order to achieve a high optical imaging quality, in the present embodiment, the micro-lens module 100 satisfies following two conditions:

$$6 > d2/d1 > 2.5; \text{ and} \qquad (i)$$

$$-2.5 < R1/R2 < 1.5. \qquad (ii)$$

In foregoing two conditions, d1 is the distance from the surface S1 to the aperture stop 120, d2 is the distance from the aperture stop 120 to the surface S4, R1 is the curvature radius of the surface S1, and R2 is the curvature radius of the surface S4. Besides, to achieve a good optical characteristic in the micro-lens module 100, if the effective focal length (EFL) of the micro-lens module 100 is f, the micro-lens module 100 satisfies 0.8<f<1.6. Moreover, in the present embodiment, the total track length of the micro-lens module 100 is 2.495 mm, and the numerical aperture (F/#) thereof is 3.

Below, an embodiment of the micro-lens module 100 will be described in detail. It should be noted that the data listed in following tables 1 and 2 is not intended to limit the scope of the invention, and which can be appropriately changed by those having ordinary knowledge in the art according to the present disclosure without departing the scope of the invention.

TABLE 1

| Surface | Curvature Radius (mm) | Thickness (mm) | Refractive Index | Abbe Number | Note |
|---|---|---|---|---|---|
| S1 | 1.103178 | 0.24 | 1.52 | 48.7 | First lens |
| S2 | Infinite | 0.7 | 1.52 | 64.2 | STOP |
| S3 | Infinite | 0.36 | 1.52 | 48.7 | |
| S4 | −2.057114 | 0.65 | | | Second Surface AIR |
| S5 | Infinite | 0.5 | 1.52 | 64.2 | Cover glass |
| S6 | Infinite | 0.045 | | | AIR |

In foregoing table 1, space refers to the linear distance between two adjacent surfaces on the optical axis A. For example, the space of the surface S3 is the linear distance from the surface S3 to the surface S4 on the optical axis A. The thickness, refractive index, and Abbe number of each lens in the "Note" field can be referred to the corresponding values of the space, refractive index, and Abbe number in the same row. Besides, in foregoing table 1, the surfaces S1 and S2 are two surfaces of the first lens 110, and the surfaces S3 and S4 are two surfaces of the second lens 140. The surfaces S2 and S3 are two surfaces of the light transmissive device 130, and the surfaces S5 and S6 are two surfaces of a cover glass 70 on the optical detector 60, wherein the space in the row corresponding to the surface S6 refers to the space between the surface S6 and the optical detector 60.

The parameters (for example, the curvature radius and the space) of each surface can be referred to foregoing table and will not be described herein.

The surfaces S1 and S4 are even aspheric surfaces, and which can be expressed as:

$$Z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In foregoing expression, Z is the sag in the direction of the optical axis A, c is the reciprocal of the radius of an osculating sphere (i.e., the reciprocal of the curvature radius close to the optical axis A, such as the curvature radii of the surfaces S1 and S4 listed in table 1), k is a conic coefficient, r is the height of the aspheric surface (i.e., the height from the center of the lens to the rim of the lens), and $\alpha_1$-$\alpha_8$ are aspheric coefficients, wherein in the present embodiment, the aspheric coefficient $\alpha_1$ is 0. Parameters of the surfaces S1 and S4 are listed in following table 2.

TABLE 2

| Aspheric Parameters | Conic Coefficient k | Aspheric Coefficient $\alpha_2$ | Aspheric Coefficient $\alpha_3$ | Aspheric Coefficient $\alpha_4$ |
|---|---|---|---|---|
| S1 | 2.298106 | −2.0278762 | 70.184679 | −1386.2238 |

| Aspheric Parameters | Aspheric Coefficient $\alpha_5$ | Aspheric Coefficient $\alpha_6$ | Aspheric Coefficient $\alpha_7$ | Aspheric Coefficient $\alpha_8$ |
|---|---|---|---|---|
| S1 | 13561.035 | −58304.532 | 25449.915 | 357677.94 |

| Aspheric Parameters | Conic Coefficient k | Aspheric Coefficient $\alpha_2$ | Aspheric Coefficient $\alpha_3$ | Aspheric Coefficient $\alpha_4$ |
|---|---|---|---|---|
| S4 | −50 | 0.16221266 | −3.0962791 | 28.161333 |

| Aspheric Parameters | Aspheric Coefficient $\alpha_5$ | Aspheric Coefficient $\alpha_6$ | Aspheric Coefficient $\alpha_7$ | Aspheric Coefficient $\alpha_8$ |
|---|---|---|---|---|
| S4 | −100.14475 | 137.29009 | 45.062803 | −205.62814 |

Figure 2A:
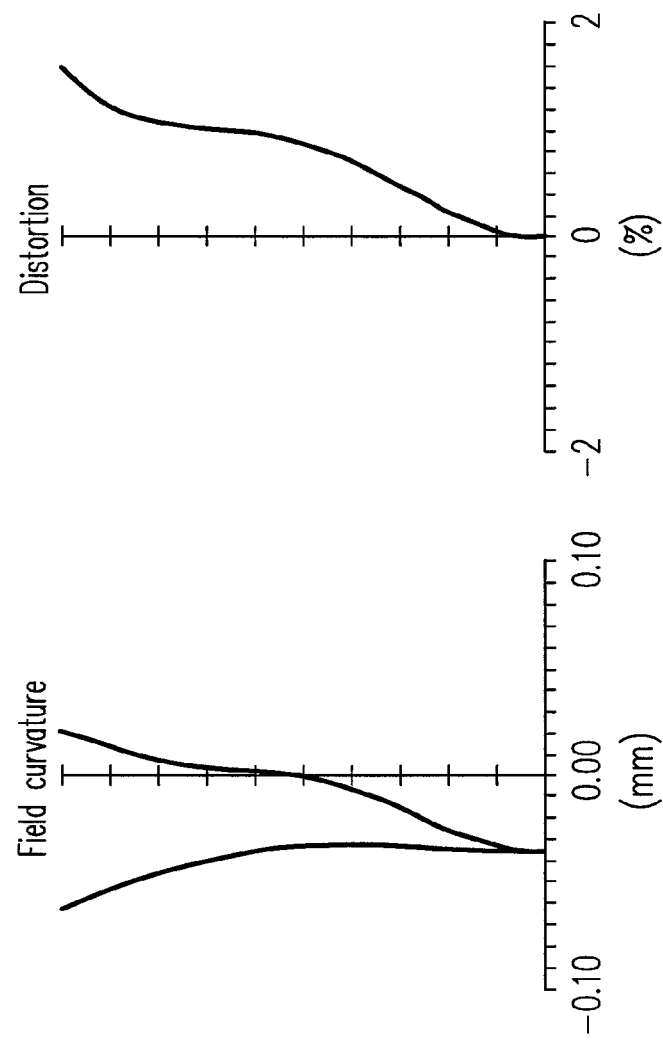
FIG. 2A and FIG. 2B are optical imaging simulation data plots of the micro-lens module in FIG. 1.
Figure 2B:
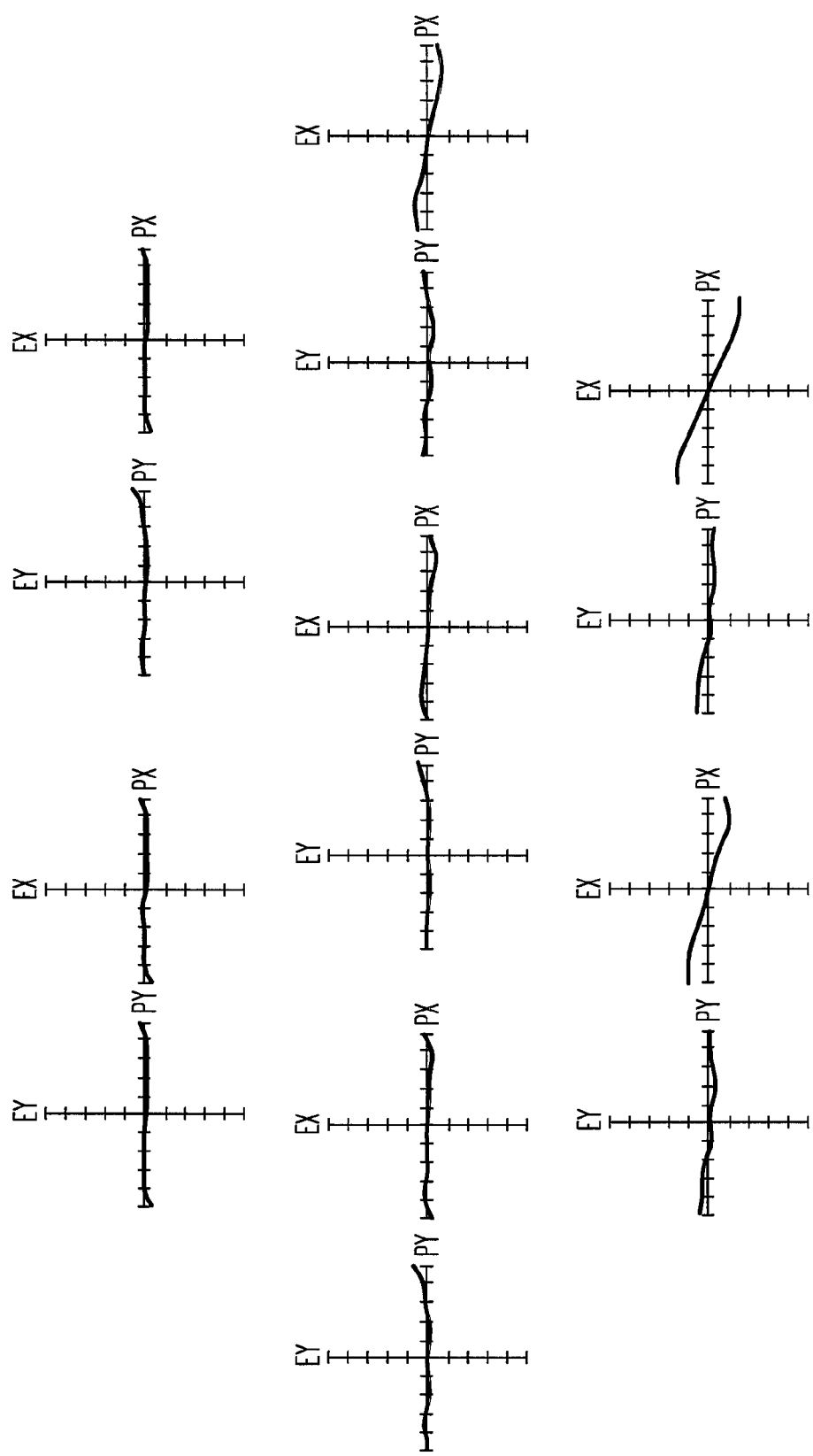

FIG. 2A and FIG. 2B are optical imaging simulation data plots of the micro-lens module 100 in FIG. 1. Referring to FIG. 2A and FIG. 2B, a field curvature data plot and a distortion data plot are respectively illustrated in FIG. 2A, wherein the data is obtained based on a simulation with a light having a 460 nm wavelength. Besides, a transverse ray fan plot of an image is illustrated in FIG. 2B, wherein the data is obtained based on a simulation with a light having a 460 nm wavelength. Since all the graphs illustrated in FIG. 2A and FIG. 2B are within standard ranges, the micro-lens module 100 in the present embodiment offers a good image quality with a minimized volume.

Figure 3:
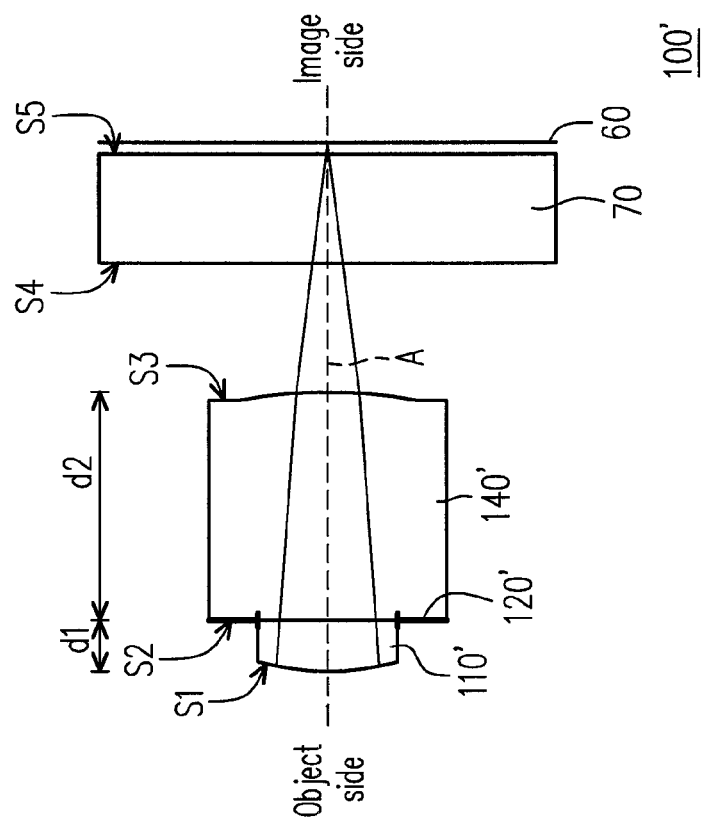
FIG. 3 is a structure diagram of a micro-lens module according to another embodiment of the invention.

FIG. 3 is a structure diagram of a micro-lens module according to another embodiment of the invention. Referring to FIG. 3, the micro-lens module 100' in the present embodiment is similar to the micro-lens module 100, and the main difference between the two micro-lens modules is that the first lens 110' is directly leaned against the surface S2 of the second lens 140'. In other words, in the present embodiment, no light transmissive device is disposed between the first lens 110' and the second lens 140'. Besides, in the present embodiment, the total track length of the micro-lens module 100' is 1.268, and the numerical aperture (F/#) thereof is 3.

It should be noted that in the present embodiment, the aspheric surface of the second lens facing the image side is the surface S3, and the curvature radius thereof is R2. Besides, the distance from the surface S3 of the second lens 140 to the aperture stop is defined as d2.

Namely, in an exemplary embodiment of the invention, the distance d1 is defined as the distance between the aspheric surface of the first lens and the aperture stop, and the distance d2 is defined as the distance between the aspheric surface of the second lens and the aperture stop.

Below, an embodiment of the micro-lens module 100' will be described in detail. It should be noted that the data listed in following table 3 and table 4 is not intended to limit the invention, and which may be appropriately changed by those having ordinary knowledge in the art according to the present disclosure without departing the scope of the invention.

TABLE 3

| Surface | Curvature Radius (mm) | Thickness (mm) | Refractive Index | Abbe Number | Node |
|---|---|---|---|---|---|
| S1 | 0.552 | 0.12 | 1.52 | 48.7 | First Surface |
| S2 | Infinite | 0.53 | 1.52 | 48.7 | STOP |
| S3 | −1.028557 | 0.28 | | | Second Surface AIR |
| S4 | Infinite | 0.3 | 1.52 | 64.2 | Cover glass |
| S5 | Infinite | 0.038 | | | AIR |

In foregoing table 3, space refers to the linear distance between two adjacent surfaces on the optical axis A. For example, the space of the surface S2 is the linear distance from the surface S2 to the surface S3 on the optical axis A. The thickness, refractive index, and Abbe number of each lens in the "Note" field can be referred to the corresponding values of the space, refractive index, and Abbe number in the same row. Besides, in foregoing table 3, the surfaces S1 and S2 are two surfaces of the first lens 110', and the surfaces S2 and S3 are two surfaces of the second lens 140'. The surfaces S4 and S5 are two surfaces of a cover glass 70 on the optical detector 60, wherein the space in the row corresponding to the surface S5 refers to the space between the surface S5 and the optical detector 60.

The parameters (for example, the curvature radius and the space) of each surface can be referred to foregoing table and will not be described herein.

The surfaces S1 and S3 are even aspheric surfaces, and which can be expressed as:

$$Z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In foregoing expression, Z is the sag in the direction of the optical axis A, c is the reciprocal of the radius of an osculating sphere (i.e., the reciprocal of the curvature radius close to the optical axis A, such as the curvature radii of the surfaces S1 and S3 listed in table 3), k is a conic coefficient, r is the height of the aspheric surface (i.e., the height from the center of the lens to the rim of the lens), and $\alpha_1$-$\alpha_8$ are aspheric coefficients, wherein in the present embodiment, the aspheric coefficient $\alpha_1$ is 0. Parameters of the surfaces S1 and S3 are listed in following table 4.

TABLE 4

| Aspheric Parameters | Conic Coefficient k | Aspheric Coefficient $\alpha_2$ | Aspheric Coefficient $\alpha_3$ | Aspheric Coefficient $\alpha_4$ |
|---|---|---|---|---|
| S1 | 2.298106 | −16.22301 | 2245.9097 | −177436.65 |
| Aspheric Parameters | Aspheric Coefficient $\alpha_5$ | Aspheric Coefficient $\alpha_6$ | Aspheric Coefficient $\alpha_7$ | Aspheric Coefficient $\alpha_8$ |
| S1 | 6943249.9 | −1.1940768e+008 | 2.084857e+008 | 1.1720391e+010 |
| Aspheric Parameters | Conic Coefficient k | Aspheric Coefficient $\alpha_2$ | Aspheric Coefficient $\alpha_3$ | Aspheric Coefficient $\alpha_4$ |
| S3 | −50 | 1.2977013 | −99.080931 | 3604.6506 |
| Aspheric Parameters | Aspheric Coefficient $\alpha_5$ | Aspheric Coefficient $\alpha_6$ | Aspheric Coefficient $\alpha_7$ | Aspheric Coefficient $\alpha_8$ |
| S3 | −51274.114 | 281170.09 | 369154.48 | −6738022.7 |

Figure 4A:
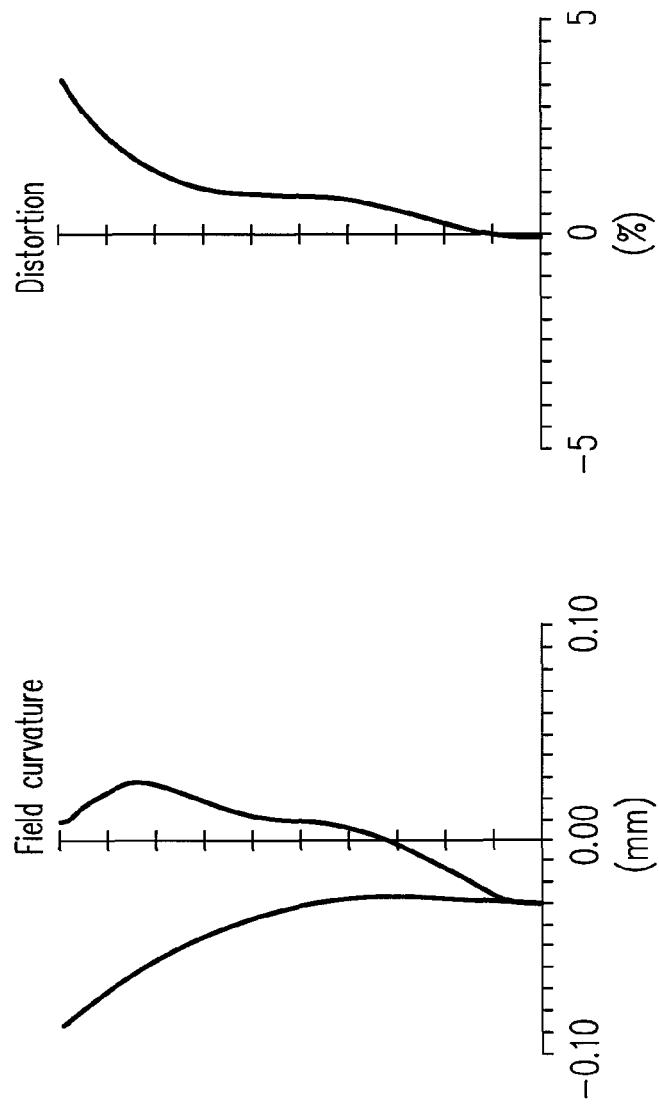
FIG. 4A and FIG. 4B are optical imaging simulation data plots of the micro-lens module in FIG. 3.
Figure 4B:
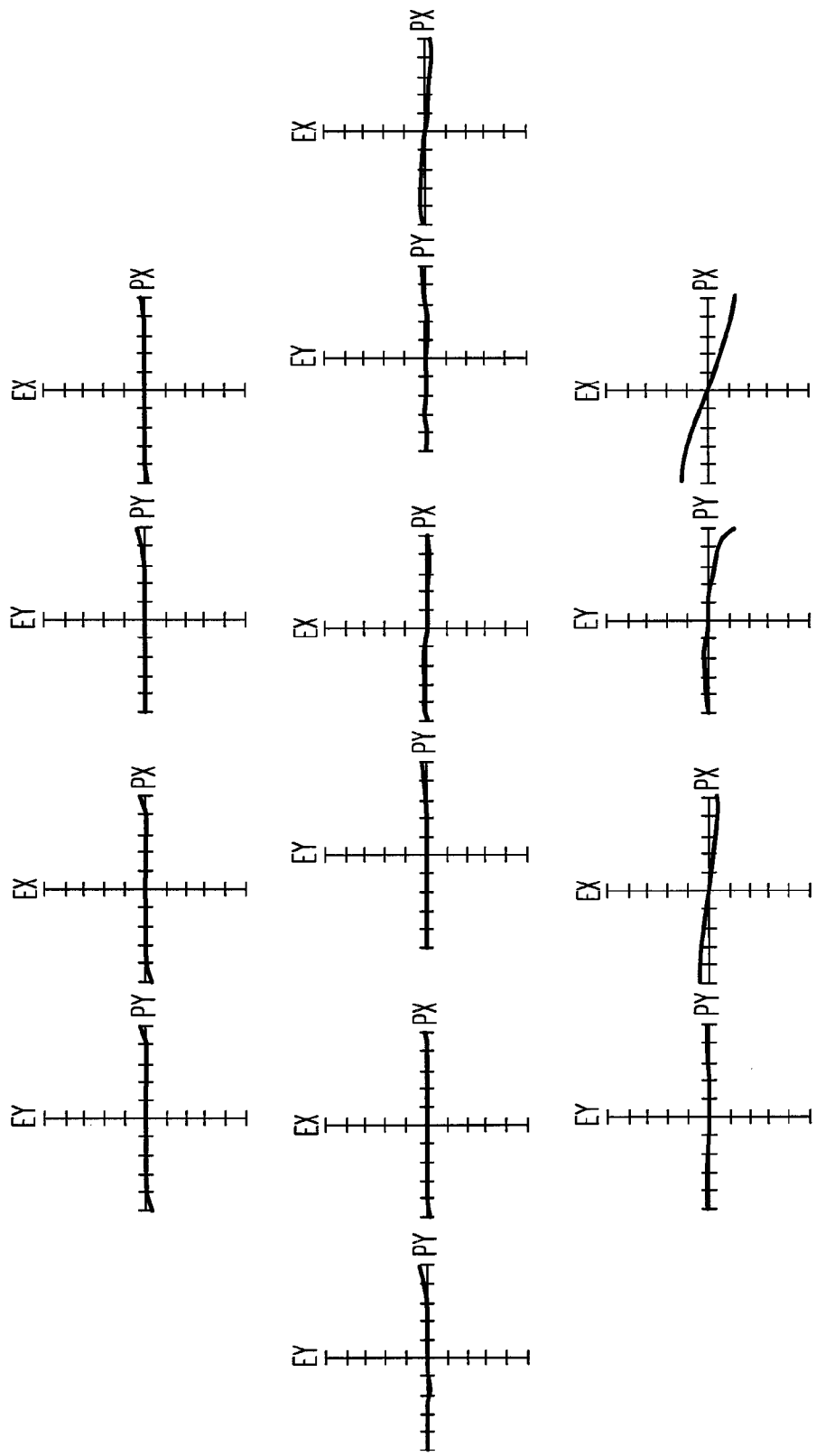

FIG. 4A and FIG. 4B are optical imaging simulation data plots of the micro-lens module 100' in FIG. 3. Referring to FIG. 4A and FIG. 4B, a field curvature data plot and a distortion data plot are respectively illustrated in FIG. 4A, wherein the data is obtained based on a simulation with a light having a 460 nm wavelength. Besides, a transverse ray fan plot of an image is illustrated in FIG. 4B, wherein the data is obtained based on a simulation with a light having a 460 nm wavelength. Since all the graphs illustrated in FIG. 4A and FIG. 4B are within standard ranges, the micro-lens module 100' in the present embodiment offers a good image quality with a minimized volume.

In summary, a micro-lens module provided by an exemplary embodiment of the invention offers high image quality, low fabricating cost, and small volume with the structure described above.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A lens module, comprising:
    a first lens, disposed between an object side and an image side, wherein a first surface of the first lens facing the object side is an aspheric surface, and a curvature radius of the first surface is R1;
    a second lens, disposed between the first lens and the image side, wherein a second surface of the second lens facing the image side is an aspheric surface, and a curvature radius of the second surface is R2;
    a light transmissive device, wherein the first lens and the second lens are respectively leaned against two opposite sides of the light transmissive device; and
    an aperture stop, disposed between the first lens and the second lens, wherein a distance from the first surface to the aperture stop is d1, and a distance from the second surface to the aperture stop is d2,
    wherein the lens module satisfies 6>d2/d1>2.5 and −2.5<R1/R2<1.5, an effective focal length (EFL) of the lens module is f, and the lens module satisfies 0.8<f<1.6, and a material refractive index of the first lens and the second lens is $n_d$, and $1.62>n_d>1.48$,
    wherein the first surface and the second surface are even aspheric surfaces, and which are respectively expressed as:

$$Z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}.$$

wherein $\alpha_1$ to $\alpha_8$ are aspheric coefficients, and the first surface and the second surface satisfy $\alpha_1=0$.

2. The lens module according to claim 1, wherein the first surface is a convex surface, and the first lens is a plano-convex lens having the convex surface facing the object side.

3. The lens module according to claim 1, wherein the second surface is a convex surface, and the second lens is a plano-convex lens having the convex surface facing the image side.

4. The lens module according to claim 1, further comprising a optical detector, wherein the lens module is sequentially composed of the first lens, the aperture stop, the second lens, and the optical detector from the object side to the image side.

* * * * *